(12) United States Patent
Scaggs (10) Patent No.: US 8,274,743 B2
(45) Date of Patent: Sep. 25, 2012

(54) THERMALLY COMPENSATING LENS FOR HIGH POWER LASERS

(76) Inventor: Michael J. Scaggs, Weston, FL (US)

(*) Notice: Subject to any disclaimer, the term of this patent is extended or adjusted under 35 U.S.C. 154(b) by 0 days.

(21) Appl. No.: 12/756,642

(22) Filed: Apr. 8, 2010

(65) Prior Publication Data

US 2011/0249342 A1   Oct. 13, 2011

(51) Int. Cl.
G02B 27/30 (2006.01)
(52) U.S. Cl. .......................................... 359/641; 372/58
(58) Field of Classification Search ................... 359/641
See application file for complete search history.

(56) References Cited

U.S. PATENT DOCUMENTS

| | | | |
|---|---|---|---|
| 4,721,373 A | 1/1988 | Sugiyama | |
| 4,834,472 A | 5/1989 | Palmer | |
| 4,838,665 A | 6/1989 | Hasegawa et al. | |
| 5,128,953 A | 7/1992 | Macken | |
| 6,104,546 A | 8/2000 | Yoshikawa | |
| 6,339,505 B1 * | 1/2002 | Bates | 359/642 |
| 2006/0256306 A1 * | 11/2006 | Lin et al. | 355/53 |
| 2010/0110275 A1 * | 5/2010 | Mathieu | 348/360 |

FOREIGN PATENT DOCUMENTS

EP   1791229 A1   11/2005

OTHER PUBLICATIONS

Abt et al., Focusing High-Power, Single Mode Laser Beams, Photonics Spectra Magazine, May 2008, available at http://www.photonics.com/printerFriendly.aspx?ArticleID=33535&Publication=5, accessed on Nov. 5, 2009.
Steele et al., Spot Size and Effective Focal Length Measurements for a Fast Axial Flow CO2 Laser, 1997,U.S. Department of Energy.
Klein, Materials for High-Energy Laser Windows: How Thermal Lensing and Thermal Stresses Control the Performance, SPIE Proceedings vol. 6666, 66660Z1 (2007).
Fishcer et al., Optical System Design, McGraw Hill, 2008, pp. 246-249.
Smith, Modern Optical Engineering, McGraw Hill 2000, pp. 412-413.
Smith, Practical Optical System Layout and Use of Stock Lenses, McGraw Hill 1997, pp. 144-145.
International Search Report with mail date of Jan. 2, 2012 for corresponding international patent application No. PCT/US2011/031700 with international filing date of Apr. 8, 2011.

* cited by examiner

*Primary Examiner* — James Jones
(74) *Attorney, Agent, or Firm* — Ronald E. Smith; Smith & Hopen, P.A.

(57) ABSTRACT

A method for thermally compensating lenses in an optical system for high power lasers includes the steps of providing a fused silica lens to collimate a high power laser beam and positioning that lens in collimating relation to the laser beam. A focusing lens assembly is provided to focus the collimated laser beam and is positioned in focusing relation to the collimated laser beam. At least one lens having a negative dn/dT to offset a heat-induced change in index of refraction of the fused silica lens is included as a part of the collimating lens assembly and as a part of the focusing lens assembly. The lens having a negative dn/dT is selected from a group of glasses having a negative dn/dT. The power of the lenses is balanced with an offsetting negative dn/dT so that the optical system maintains its focus over a wide temperature range.

7 Claims, 7 Drawing Sheets

THERMALLY COMPENSATING LENS FOR HIGH POWER LASERS

BACKGROUND OF THE INVENTION

1. Field of the Invention

This invention relates, generally, to the art of lasers. More particularly, it relates to a lens for high power lasers.

2. Description of the Prior Art

One or more high quality fused silica lenses are used to focus high power fiber lasers in excess of one kilowatt (1 kW). More specifically, at least one high quality fused silica lens is used to collimate laser light emitted from a fiber laser where the fiber ranges in diameter from 50 microns to over 300 microns. After it has been collimated, the light is directed to a focusing lens assembly made of one or more high quality fused silica lenses that focus the light on to a surface to be cut, drilled, scribed, marked or welded.

Although the fused silica lens material is highly transmissive, some radiation is either absorbed or scattered within the lens, causing the lens to heat up. All optical glass materials have certain thermal properties that change the focus characteristics of a lens as they heat up. In particular, the thermal coefficient of expansion $\alpha$ and change in index of refraction n as a function of temperature (dn/dT) alter the power of a lens. The power of a lens is influenced by these two properties and is called the thermal power of a lens:

$$\Psi_p = \left[\frac{dn/dT}{(n-1)} - \alpha\right]$$

The power of a lens is therefore altered as a function of temperature by the following equation:

$$\Delta\Phi = \Phi\left[\frac{dn/dT}{(n-1)} - \alpha\right],$$

where $\Phi$ is the power of the lens. The change in power then is the original power of the lens times the thermal power of the lens $\Psi_p$.

$$\Delta\Phi = \Phi\Psi_p$$

Fused silica has a very low coefficient of thermal expansion, a very high transmission throughout the ultraviolet to near infrared wavelengths of the electromagnetic spectrum, and low scattering qualities. It is currently the most cost effective glass for the task. However, as indicated by the above equations, it is, along with all other optical glasses, susceptible to focal power changes as the temperature of the glass increases. The problem of focal power changes due to heat is problematic with conventional fiber lasers having average powers now in excess of 20 kW.

The coefficient of thermal expansion (CTE) for fused silica is about $0.5\times10^{-6}/°$ K and has a dn/dT of $\sim10\times10^{-6}/°$ K. A fused silica lens having a nominal focal length of 200 mm will have a change in focus of more than 350 microns for a 100° C. temperature increase. Although this is not a huge amount for such a long focal length lens, when used as a collimator for a fiber it has a substantial impact on how the light is collimated from the fiber.

A paper written by Abt et al, *Focusing High-Power, Single Mode Laser Beams*, Photonics Spectra Magazine, May 2008, discusses this problem and shows focus shifts of between 1 and 2 mm through a range of powers of 100 watts to 900 watts of laser power using a variety of fused silica lens and gradium index glasses. Steele et at describe a similar behavior with a CO2 laser in *Spot Size and Effective Focal Length Measurements for a Fast Axial Flow CO 2 Laser*, in a paper released by the Department of Energy. Thermal lensing in window materials is further discussed by Klein in *Materials for High-Energy Laser Windows: How thermal Lensing and Thermal Stress Control Performance*, SPIE Proceedings Vol. 6666, 66660Z1 (2007).

The conventional method for handling thermal lensing of an optical system is to let the system thermally stabilize for three or four minutes, followed by readjusting the focus of the collimation optics and the focusing optic. This is a very undesirable and expensive delay in a production environment.

U.S. Pat. No. 5,128,953 discloses a method for aiding the cooling of a lens by placing a small gap between the focus lens and a debris shield. This method has utility with low power lasers. It does not solve the collimation problems of high power fiber lasers without adding additional optics which should be avoided with high power lasers. The prior art requires an additional window, i.e. an extra optic, without improving the optical performance and without providing a means to provide a cooling gas when a multi element lens is required.

European patent application EP 1 791 229 A1 discloses a method for reducing thermal lensing with the use of radially polarized light and stress birefringence in ZnSe. This approach has very limited utility and is not practical for high power fiber lasers which are not polarized.

Athermalization is commonly applied to mid infrared optical systems but not specifically applied to high power lasers. These systems are adapted to compensate thermal changes over a broad spectrum within the infrared. Athermalization is discussed by Smith, *Modern Optical Engineering*, McGraw Hill 2000 and in *Practical Optical System Layout and Use of Stock Lenses*, McGraw Hill, 1997 and by Fishcer et al in *Optical System Design*, McGraw Hill, 2008. These texts teach to achromatize and athermalize by solving three simultaneous equations:

$$\Phi = \Phi_a + \Phi_b$$

$$\Delta\Phi = \varphi_a\Phi_a + \varphi_a\Phi_b$$

$$\frac{d\Phi}{dT} = \Psi_a\Phi_a + \Psi_b\Phi_b$$

Where $\Phi$ is the power of the lens system, $\Phi_a$ and $\Phi_b$ are the powers of the individual lens elements; $\phi_a$ and $\phi_b$ are the chromatic powers of each element and $\Psi_a$ and $\Psi_b$ are the thermal powers of the lenses. The chromatic power of a lens is the inverse of its abbe value v.

In view of the prior art considered as a whole at the time the present invention was made, it was not obvious to those of ordinary skill in the art how the limitations of the prior art could be overcome.

SUMMARY OF THE INVENTION

The long-standing but heretofore unfulfilled need for a collimation means for high power lasers is now met by a new, useful, and non-obvious invention.

The inventive structure includes a thermal compensation lens assembly made of two or more optical elements where a first element compensates for the thermal power of a second element so as not to alter the overall power of the system. In the inventive system, the extra optics improves the optical performance of the lens system and provides a means to provide a cooling gas.

This invention improves conventional technology by harnessing the thermal advantages of fused silica and offsetting the change in index of refraction with a second material having a negative dn/dT. While most glasses exhibit a positive change in index of refraction as the material increases in temperature, some glasses, such as CaF2, BaF2, LiF2, NaCl, KCl, have negative dn/dTs. There are other glasses that have negative dn/dTs and the invention is not limited to the glasses listed here which are illustrative of the concept. By balancing the power of the lenses in the system with an offsetting dn/dT, the optical system maintains its focus over a wide temperature range.

As stated earlier, the power of a two lens system is given by:

$$\Phi = \Phi_a + \Phi_b$$

Where $\Phi_a$ is the power of the first element and $\Phi_b$ is the power of the second element. If the lens system is subjected to a temperature change its power is changed by:

$$\Delta\Phi = \Psi_a \Phi_a + \Psi_b \Phi_b$$

Which is the sum of the power of each element times its thermal power $\Psi$. In order to obtain a zero shift in focus, the powers of the two lens must balance as follows:

$$\Psi_a \Phi_a = -\Psi_b \Phi_b$$

A laser is a monochromatic light source so the chromatic power of the lens is irrelevant and the above equations are all that is needed to athermalize a laser focusing lens. An ideal situation is where the coefficient of expansion α of each glass is identical and the dn/dT of a first material is the exact negative of a second material. That ideal is unattainable but the offsets in α and the dn/dT is compensated for by varying the thickness and curvatures of the elements to achieve more exact absolute values of each $\Psi\Phi$.

A primary object of the invention is to maintain a constant focal position, within the Rayleigh range (depth of focus) of the system as the temperature varies between ambient and a thermally stabilized temperature.

Another object is to provide thermal management to the optical elements to dissipate the absorbed heat as laser power is increased.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
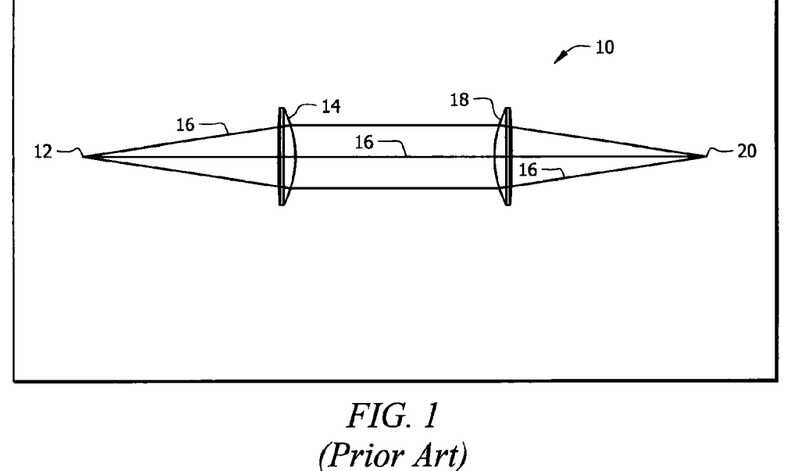
FIG. 1 depicts a prior art high power fiber laser light emitted from the output of a fiber and refocused onto a surface.

FIG. 1 is a diagrammatic representation of a conventional arrangement of lenses, denoted as a whole by the reference numeral 10.

More particularly, FIG. 1 depicts a high power fiber laser light emitted from the output of a fiber 12. Lens 14 collimates light 16 and lens 18 refocuses the light onto focal point 20 that is formed on the surface of a material to be cut, drilled, scribed, marked, welded or otherwise treated. Both lenses are made from high quality fused silica.

Figure 2:
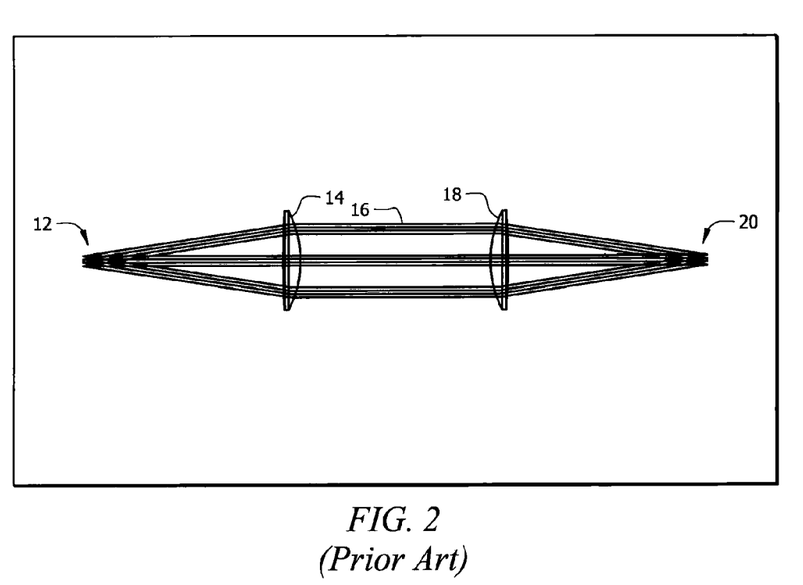
FIG. 2 depicts the FIG. 1 lenses with a multi-thermal configuration.

FIG. 2 depicts the FIG. 1 lenses but a multi-thermal configuration has been set up where lenses 14 and 18 are at ambient temperature of 25° C., followed by increase to 50° C., 75° C. and 125° C. respectively. Focus 20 shifts towards said lens due to the temperature increase. Each configuration is overlaid with an offset of two millimeters (2 mm) to show the variation in focus as the temperature is increased.

Figure 3:
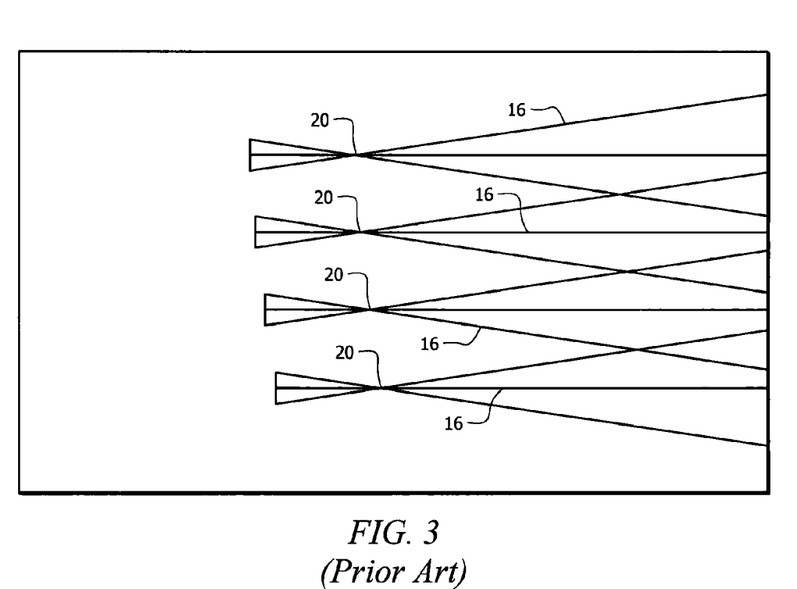
FIG. 3 is an enlarged view of the focus of FIG. 2.

FIG. 3 is an enlarged view of the focus of FIG. 2. The focus shift from the ambient condition at the top of FIG. 3 to the highest temperature, at the bottom of FIG. 3, is 0.644 mm.

Figure 4:
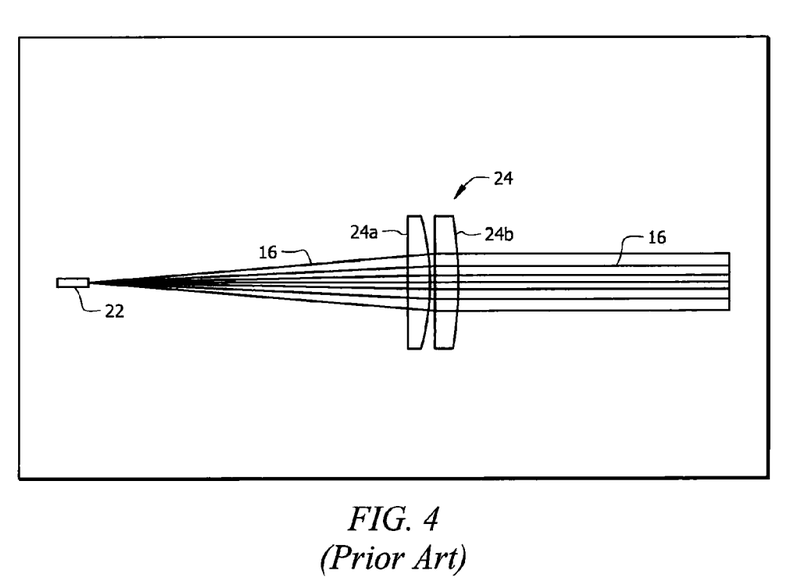
FIG. 4 depicts a conventional fiber collimator for a high power fiber laser.

FIG. 4 depicts a conventional fiber collimator for a high power fiber laser 22. Fused silica doublet 24 including plano-convex lens 24a and bi-convex lens 24b that produces a suitable level of collimation with minimal wavefront error.

Figure 5:
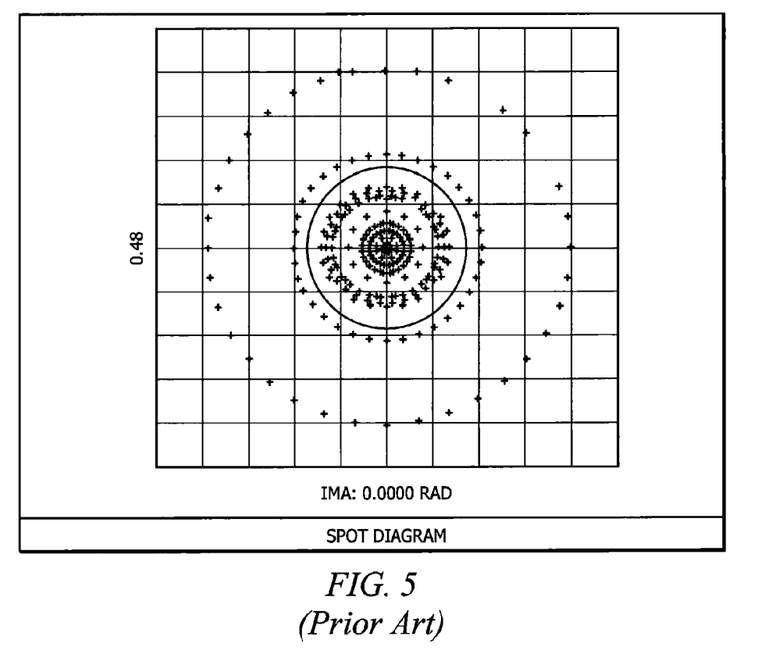
FIG. 5 is a spot diagram of the collimation lens doublet depicted in FIG. 4.

FIG. 5 is a spot diagram of the collimation lens doublet 24 depicted in FIG. 4. The airy disk radius (diffraction limited divergence) for this lens system is 0.074 mradians. As the temperature values increase past 50° C. the rays begin to diverge beyond the diffraction limit and the outermost sets of rays extend to 0.161 mradians at 125° C.

Figure 6:
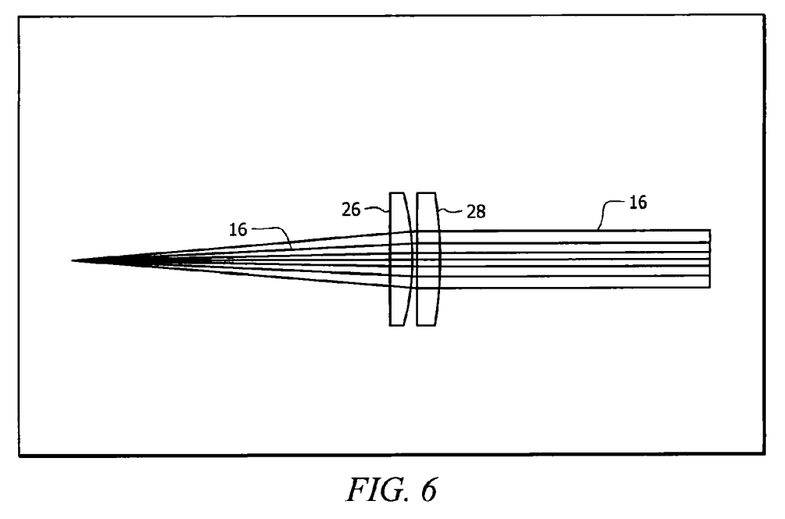
FIG. 6 depicts the invention configured as a fiber collimator for a high power fiber laser.

FIG. 6 depicts the invention configured as a fiber collimator for a high power fiber laser. First lens 26 is a fused silica lens and second lens 28 is made from Schott N-PSK53A.

Figure 7:
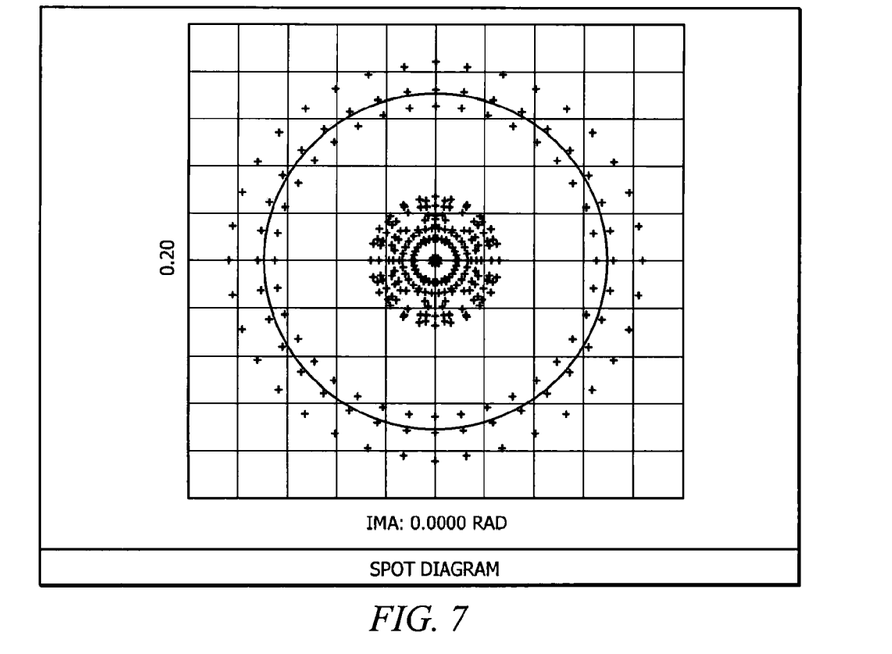
FIG. 7 is the spot diagram for the collimator depicted in FIG. 6.

FIG. 7 is the spot diagram for the novel collimator depicted in FIG. 6. The divergence of the system at the higher temperature has been reduced to 0.083 mradians which is very close to the diffraction limit of 0.0701 mradians.

Figure 8:
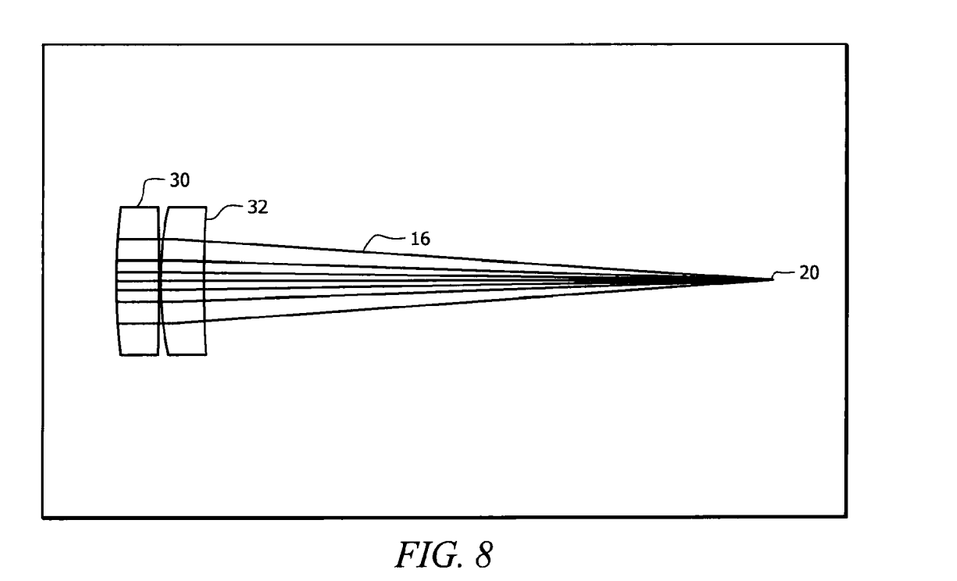
FIG. 8 depicts the invention configured as a focusing objective for a high power fiber laser.

FIG. 8 depicts the invention as a focusing objective for a high power fiber laser. First lens 30 is a fused silica lens and second lens 32 is made from Schott N-PSK53A.

Figure 9:
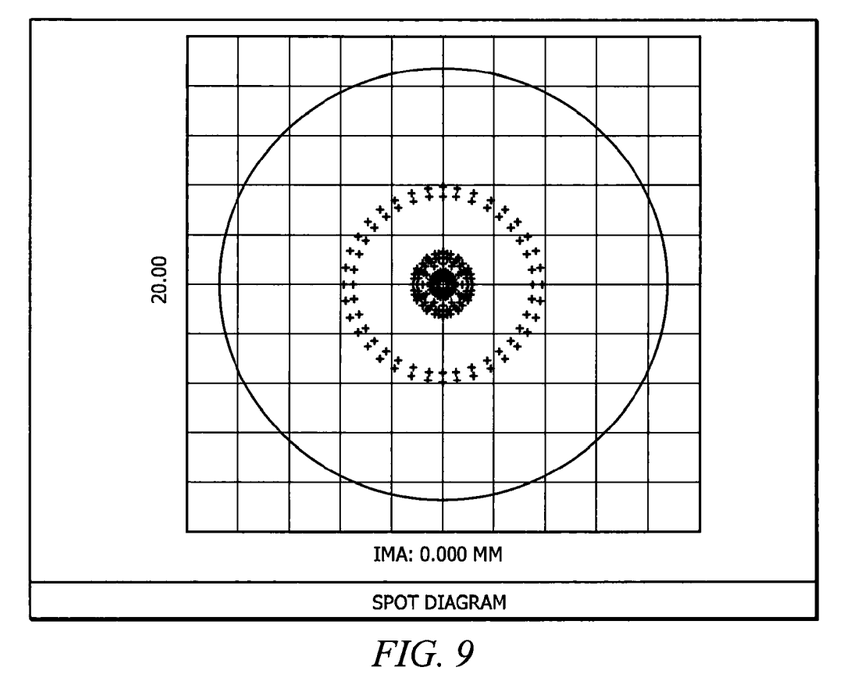
FIG. 9 is the spot diagram for the focusing objective depicted in FIG. 8.

FIG. 9 is the spot diagram for the focusing objective depicted in FIG. 8. The rms spot radius is 2.129 microns and the geometric radius is 3.936 microns which is well below the diffraction limit of 8.737 microns.

Figure 10:
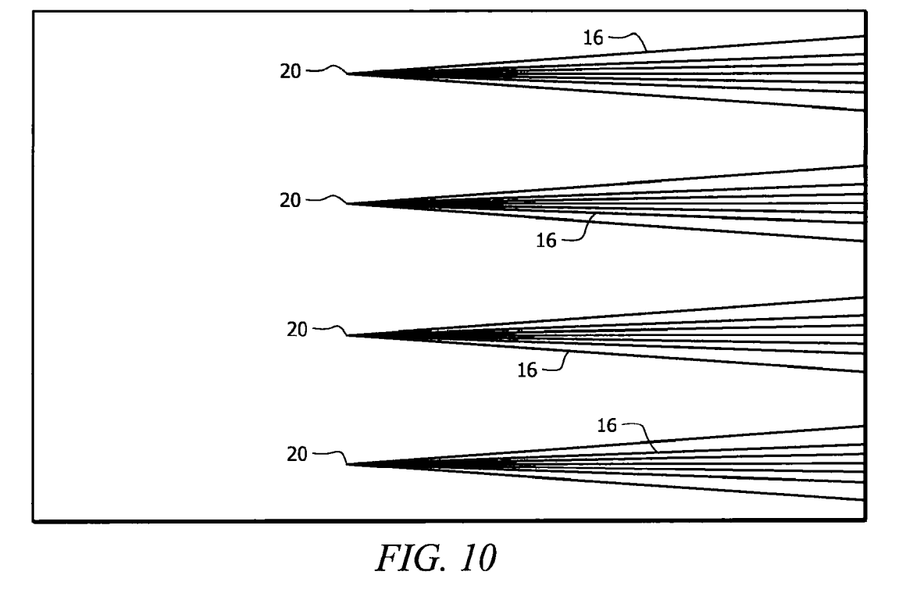
FIG. 10 is an enlarged view of the ray trace of the objective depicted in FIG. 8.

FIG. 10 is an enlarged view of the ray trace of the objective depicted in FIG. 8 showing no distinguishable difference in the focal position 20 as the temperature of the lens system increases over the range of 25° C., 50° C., 75° and 125° C., top to bottom, respectively.

Figure 11:
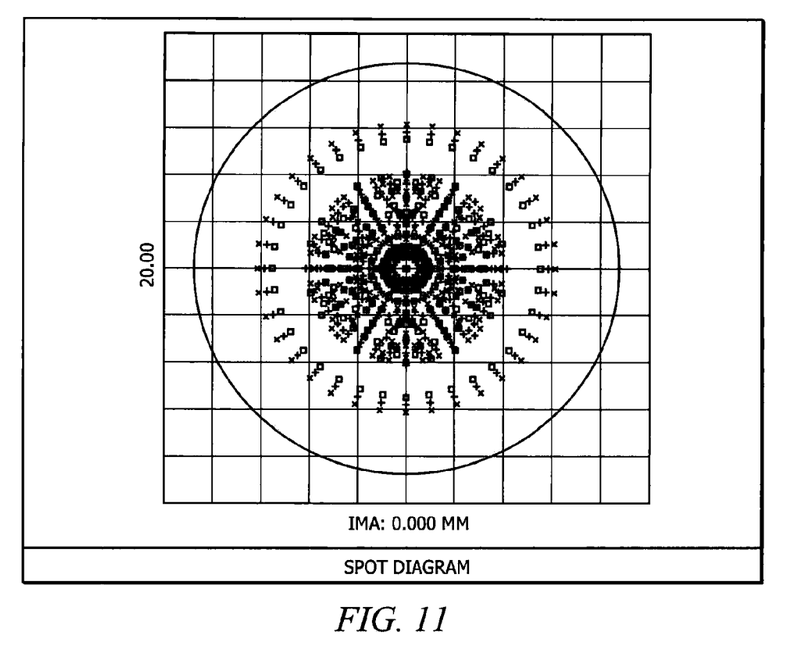
FIG. 11 is a spot diagram of a fused silica and CaF2 doublet that have been thermally optimized for minimal focal shift variation.

FIG. 11 is a spot diagram of a fused silica and CaF2 doublet that has been thermally optimized for minimal focal shift variation.

Figure 12:
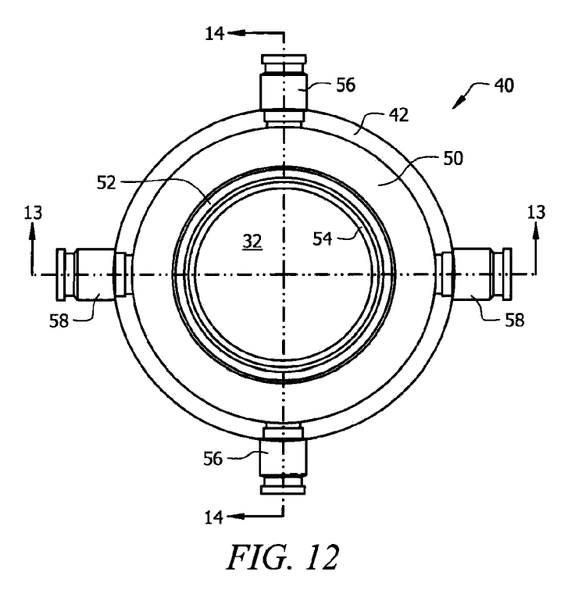
FIG. 12 is an end view of a lens holding apparatus.
Figure 13:
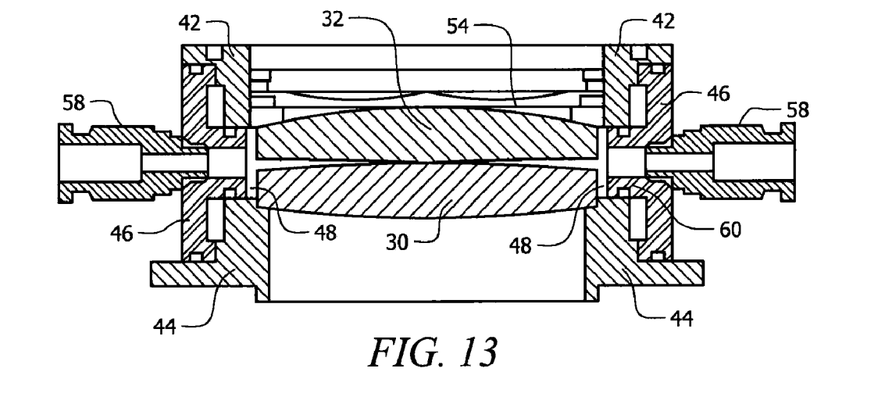
FIG. 13 is a sectional view taken along line 13-13 in FIG. 12.

An end view of a lens holding apparatus 40 is provided in FIG. 12. Apparatus 40 includes annular compression end cap 42 that cooperates with annular reference end cap 44 as depicted in FIG. 13 to hold annular main housing 46 therebetween. Lenses 30, 32 are separated at their respective peripheral edges by annular invar separator 48 that is positioned radially inwardly of main housing 46 as depicted. Annular retaining ring 50 cooperates with a plurality of circumferentially spaced apart wavespring seats, collectively denoted 52 to hold annular wavespring 54 therebetween. Wavespring 54 is rated at about sixty five pounds (65 lbs).

Figure 14:
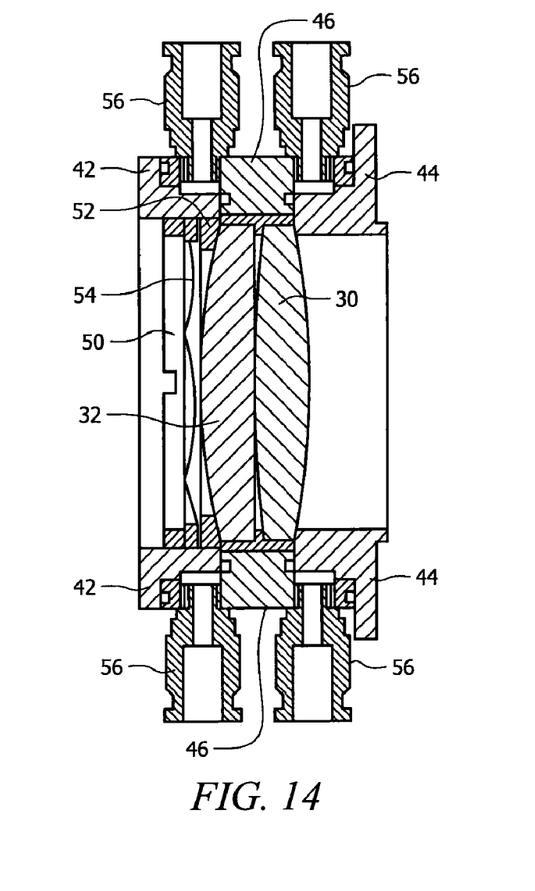
FIG. 14 is a sectional view taken along line 14-14 in FIG. 12.

The lenses are cooled by separate circuits in fluid communication with couplings 56 of which there are four (4) as indicated in said FIG. 13. Intralens gas fitting 58, depicted in FIGS. 12 and 14, provides fluid communication from a remote gas source, preferably Helium having a thermal conductivity of 0.142 W/m° C. which is nearly 6 times greater than air (0.024 W/m° C.) and therefore can better conduct the heat away from the lenses, to the space between lenses 30, 32. Port 60 provides a vent for the gas. If helium is used, it can be recycled and if air is used, it can be carried away from the lens assembly. In any event, the cooling gas must be free of residues or particulates that could contaminate the lens.

Couplings 56 and 58 are water cooling input and output ports. Each lens has its own cooling source and the water must be circulated to help regulate the temperature of the lens assembly. A laser with tens of kilowatts produces a tremendous amount of heat on the assembly from both absorbed light and back reflected light from the lens surfaces. For example, if there is a half percent (0.5%) loss per surface for a two (2) element optic, this represents a two percent (2%) loss and two percent (2%) of ten kilowatts (10 kW) is two hundred watts (200 W). This is a significant amount of power that has to be dissipated.

In all embodiments, at least one of the elements that make up the multi-element lens has a negative dn/dT value and at least one other lens has a positive dn/dT value.

A fused silica element and a N-PSK53A element are employed in the preferred embodiment. The N-PSK53A glass is a moldable glass. Moldability is advantageous in fabricating an aspheric surface that helps reduce spherical aberration. N-PSK53A may restrict the level of laser power used because it has more than twice the softening point compared to fused silica.

A second embodiment includes a CaF2 element and a fused silica element. CaF2 and fused silica are both good materials for high power lasers ranging from the UV through the near infrared. The invention is not limited to just these two materials. The following is a table that shows useable glasses with negative dn/dT values and the corresponding α values:

| Glass | dn/dT ($10^{-6}$/° C.) | α ($10^{-6}$/° C.) |
|---|---|---|
| BaF$_2$ | −15.2 | 18.1 |
| CaF$_2$ | −10.6 | 18.85 |
| LiF$_2$ | −12.7 | 37 |
| KBr | −40.83 | 43 |
| KCl | −33.2 | 36 |
| AgCl | −61 | 30 |
| NaCl | −36 | 44 |
| NaF | −36.2 | 36 |
| SrF$_2$ | −12 | 19.2 |
| N-PSK53A | −4.3 | 9.6 |
| N-PK51 | −8.4 | 12.4 |
| N-PK52A | −8.0 | 13 |
| N-FK51A | −7.3 | 12.7 |
| P-PK53 | −6.9 | 13.3 |
| N-FK5 | −2.6 | 9.2 |

Glasses typically used for high power lasers and their corresponding dn/dT and α values include:

| Glass | dn/dT ($10^{-6}$/° C.) | α ($10^{-6}$/° C.) |
|---|---|---|
| Fused Silica | 10 | 0.52 |
| Sapphire | 13 | 8.4 |
| BK7 | 2.4 | 7.1 |
| MgF2 | 2.3 and 1.7 | 13.7 and 8.5 |
| ZnS | 38.7 | 6.5 |
| ZnSe | 61 | 7.8 |
| Si | 160 | 4.15 |
| Ge | 396 | 5.7 |

The tables show that it is unlikely to get a perfect match of dn/dT and comparable CTEs. The thickness of the lens elements and their corresponding curvatures are the variables that can be optimized for best athermalization of a high power laser optic. This is accomplished by building a suitable merit function in an optical design software program to optimize the lens thickness, curvatures and spacing to keep the focus shift under the nominal Rayleigh range value for the lens system. A study of the tables indicates that a combination of glasses can be configured to accommodate athermalization for high power lasers ranging from the UV to the far infrared that includes, but is not limited to, excimer, Nd:YAG, Nd:YLF, fiber and $CO_2$ lasers.

The following table shows the optical prescription and thermal setting for a fused silica lens with a nominal effective focal length of 100 mm focusing light at 1.075 microns which is the typical wavelength of a high power fiber laser. The back focal length is given for each temperature variation and the corresponding difference of the focus shift to the nominal temperature is given as the "Delta" values. A positive "Delta" represents a decrease of focus towards the lens and a negative "Delta" represents an increase in focus away from the lens.

| Oper | Surf | Config 1 | Config 2 | Config 3 | Config 4 |
|---|---|---|---|---|---|
| TEMP | 0 | 20.000 | 50.000 | 75.000 | 125.000 |
| PRES | 0 | 1.000 | 1.000 | 1.000 | 1.000 |
| CRVT | 1 | 0.018 | 0.018 | 0.018 | 0.018 |
| THIC | 1 | 7.000 | 7.000 | 7.000 | 7.000 |
| GLSS | 1 | Fused Silica | Fused Silica | Fused Silica | Fused Silica |
| SDIA | 1 | 12.700 | 12.700 | 12.700 | 12.701 |
| CRVT | 2 | −0.004 | −0.004 | −0.004 | −0.004 |
| SDIA | 2 | 12.700 | 12.700 | 12.700 | 12.701 |
| TEMP | 0 | 20.000 | 20.000 | 20.000 | 20.000 |
| PRES | 0 | 1.000 | 1.000 | 1.000 | 1.000 |
| BFL | 2 | 95.695 | 95.642 | 95.596 | 95.497 |
| Delta | | 0.000 | 0.052 | 0.098 | 0.197 |

The next table shows the optical prescription for a fused silica doublet at 1.075 microns.

| Oper | Surf | Config 1 | Config 2 | Config 3 | Config 4 |
|---|---|---|---|---|---|
| TEMP | 0 | 25.000 | 50.000 | 75.000 | 125.000 |
| PRES | 0 | 1.000 | 1.000 | 1.000 | 1.000 |
| CRVT | 1 | 0.009 | 0.009 | 0.009 | 0.009 |
| THIC | 1 | 7.000 | 7.000 | 7.000 | 7.000 |
| GLSS | 1 | Fused Silica | Fused Silica | Fused Silica | Fused Silica |
| SDIA | 1 | 12.700 | 12.700 | 12.700 | 12.701 |
| CRVT | 2 | −0.002 | −0.002 | −0.002 | −0.002 |
| THIC | 2 | 0.250 | 0.250 | 0.250 | 0.250 |
| SDIA | 2 | 12.700 | 12.700 | 12.700 | 12.701 |
| CRVT | 3 | 0.016 | 0.016 | 0.016 | 0.016 |
| THIC | 3 | 7.000 | 7.000 | 7.000 | 7.000 |
| GLSS | 3 | Fused Silica | Fused Silica | Fused Silica | Fused Silica |
| SDIA | 3 | 12.700 | 12.700 | 12.700 | 12.701 |
| CRVT | 4 | 0.005 | 0.005 | 0.005 | 0.005 |
| SDIA | 4 | 12.700 | 12.700 | 12.700 | 12.701 |
| TEMP | 0 | 25.000 | 25.000 | 25.000 | 25.000 |
| PRES | 0 | 1.000 | 1.000 | 1.000 | 1.000 |
| BFL | 4 | 91.958 | 91.915 | 91.869 | 91.771 |
| Delta | | 0.000 | 0.044 | 0.090 | 0.188 |

The next table provides the prescription of the preferred embodiment for a doublet focusing a fiber laser at 1.075 microns.

| Type | Surf | Config 1 | Config 2 | Config 3 | Config 4 |
|---|---|---|---|---|---|
| TEMP | 0 | 25.000 | 50.000 | 75.000 | 125.000 |
| PRES | 0 | 1.000 | 1.000 | 1.000 | 1.000 |
| CRVT | 1 | 0.008 | 0.008 | 0.008 | 0.008 |
| THIC | 1 | 6.999 | 6.999 | 6.999 | 6.999 |
| GLSS | 1 | Fused Silica | Fused Silica | Fused Silica | Fused Silica |
| SDIA | 1 | 12.700 | 12.700 | 12.700 | 12.701 |
| CRVT | 2 | −0.002 | −0.002 | −0.002 | −0.002 |
| THIC | 2 | 0.250 | 0.250 | 0.251 | 0.251 |
| SDIA | 2 | 12.700 | 12.700 | 12.700 | 12.701 |
| CRVT | 3 | 0.015 | 0.015 | 0.015 | 0.015 |
| THIC | 3 | 6.993 | 6.995 | 6.997 | 7.000 |
| GLSS | 3 | N-PSK53A | N-PSK53A | N-PSK53A | N-PSK53A |
| SDIA | 3 | 12.700 | 12.703 | 12.706 | 12.712 |
| CRVT | 4 | 0.006 | 0.006 | 0.006 | 0.006 |
| SDIA | 4 | 12.700 | 12.703 | 12.706 | 12.712 |
| TEMP | 0 | 25.000 | 25.000 | 25.000 | 25.000 |
| PRES | 0 | 1.000 | 1.000 | 1.000 | 1.000 |
| BFL | 4 | 92.341 | 92.344 | 92.345 | 92.344 |
| Delta | | 0.000 | −0.003 | −0.004 | −0.003 |

The focus shift over the 25 to 125° C. temperature range is only about three (3) to four (4) microns which is an improvement of forty seven (47) times over the fused silica doublet in the above table.

N-PSK53A glass may not hold up to extremely high laser powers. The following table therefore shows a prescription where fused silica is used in conjunction with $CaF_2$.

| Type | Surf | Config 1 | Config 2 | Config 3 | Config 4 |
|---|---|---|---|---|---|
| TEMP | 0 | 25.000 | 50.000 | 75.000 | 125.000 |
| PRES | 0 | 1.000 | 1.000 | 1.000 | 1.000 |
| CRVT | 1 | 0.011 | 0.011 | 0.011 | 0.011 |
| THIC | 1 | 7.000 | 7.000 | 7.000 | 7.000 |
| GLSS | 1 | Fused Silica | Fused Silica | Fused Silica | Fused Silica |
| SDIA | 1 | 12.700 | 12.700 | 12.700 | 12.701 |
| CRVT | 2 | −0.002 | −0.002 | −0.002 | −0.002 |
| THIC | 2 | 0.250 | 0.251 | 0.251 | 0.253 |
| SDIA | 2 | 12.700 | 12.700 | 12.700 | 12.701 |
| CRVT | 3 | 0.016 | 0.016 | 0.016 | 0.016 |
| THIC | 3 | 6.987 | 6.990 | 6.994 | 7.000 |
| GLSS | 3 | CaF2 | CaF2 | CaF2 | CaF2 |
| SDIA | 3 | 12.700 | 12.706 | 12.712 | 12.723 |
| CRVT | 4 | 0.007 | 0.007 | 0.007 | 0.007 |
| SDIA | 4 | 12.700 | 12.706 | 12.712 | 12.723 |
| TEMP | 0 | 25.000 | 25.000 | 25.000 | 25.000 |
| PRES | 0 | 1.000 | 1.000 | 1.000 | 1.000 |
| BFL | 4 | 91.111 | 91.125 | 91.139 | 91.164 |
| Delta | | 0.000 | −0.014 | −0.028 | −0.053 |

The presence of $CaF_2$ causes the focal length of the system to increase by fifty three (53) microns as indicated by the negative sign in contrast to the fused silica doublet. The focal shift is improved three and one-half (3.5) times over the prior art and the optics can be used at very high average power levels. Inspection of the spot diagram of FIG. 11 indicates that the size of the spot decreases as the lens system heats up. Therefore, even though the focal length is slightly increasing, it is further reducing aberrations and improving performance of the lens system and thereby making it more diffraction limited.

To further enhance the performance of the optical design, a separation ring is fabricated of low thermal expansion material such as Invar which has a CTE of $1.5 \times 10^{-6}/°$ C. This ring is a split ring that fits over the outside diameter of each element; the split allows expansion of the glass. The Invar separating ring adds a means to conduct heat away from the lenses. Each side of the Invar separator is further machined to follow the contour of the lenses for greatest area contact on the perimeter and the first few millimeters radially across the lenses. The main housing of the objective assembly is made of a brass material having water cooling ports; no liquid actually contacts the lenses. The Invar separator has a gas bleed hole in diametrically opposed relation to the split so that clean, dry purge gas can be used to further cool the optical elements. The optics are referenced to the last surface of the assembly and secured by a wave spring that seats against the first element. The assembly is allowed to expand towards the laser and not the work piece to further reduce focus shift due to thermal expansion of the materials involved.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method for thermally compensating lenses in an optical system for high power lasers, comprising the steps of:
   providing a high power laser, said high power laser emitting a high power laser beam that caused heat-induced changes in an index of refraction of a lens through which said high power laser beam passes;
   providing a positive dn/dT lens to collimate said high power laser beam and positioning said positive dn/dT lens in collimating relation to said high power laser beam, said positive dn/dT lens having an index of refraction;
   providing a focusing lens assembly to focus said high power laser beam and positioning said focusing lens assembly in focusing relation to said collimated laser beam; and
   including as a part of said focusing lens assembly at least one lens having a negative dn/dT to offset a heat-induced change in the index of refraction of said positive dn/dT lens.

2. The method of claim 1, further comprising the steps of:
   selecting said at least one lens having a negative dn/dT that is substantially equal to the positive dn/dT of said positive lens from a group of lenses having a negative dn/dT;
   whereby the positive dn/dT lens in said optical system is balanced with an offsetting negative dn/dT lens so that said optical system maintains its focus over a wide temperature range.

3. The method of claim 1, further comprising the steps of:
   providing said positive dn/dT lens in the from of a fused silica lens and providing said at least one lens having a negative dn/dT in the form of an N-PSK53A lens in said focusing lens assembly for focusing said collimated laser beam onto a surface;
   whereby the N-PSK53A lens compensates for the thermal power of the fused silica lens so that the overall power of the system is substantially unaltered.

4. A method for thermally compensating lenses in a collimating optical system for high power lasers, comprising the steps of:
   forming said collimating optical system by positioning a fused silica lens and an N-PSK53A lens in cooperative relation to one another and in collimating relation to a beam of light emitted by a high power laser.

5. A method for thermally compensating lenses in a focusing objective lens system for high power lasers, comprising the steps of:
   forming said focusing objective lens system by positioning a fused silica lens and an N-PSK53A lens in cooperative relation to one another and in focusing relation to a beam of light emitted by a high power laser.

6. A method for thermally compensating lenses in a focusing objective system for high power lasers, comprising the steps of:
   forming said focusing objective system by positioning a fused silica lens and a lens selected from a group of lenses formed of CaF2, BaF2, LiF2, NaCl, and KCl glass in cooperative relation to one another and in focusing objective relation to a beam of light emitted by a high power laser.

7. A method for thermally compensating lenses in a focusing objective lens system through which passes collimated light emitted by a high power laser, comprising the steps of:
   forming said focusing objective lens system by positioning a fused silica lens and a lens selected from a group of lenses formed of CaF2, BaF2, LiF2, NaCl, and KCl glass in cooperative relation to one another and in focusing relation to said collimated beam of light.

* * * * *